United States Patent [19]
Govoni et al.

[11] Patent Number: 5,698,642
[45] Date of Patent: Dec. 16, 1997

[54] PROCESS AND APPARATUS FOR THE GAS-PHASE POLYMERIZATION OF α-OLEFINS

[75] Inventors: Gabriele Govoni, Renazzo; Roberto Rinaldi, Mantova; Massimo Covezzi; Paolo Galli, both of Ferrara, all of Italy

[73] Assignee: Montel Technology Company bv, Netherlands

[21] Appl. No.: 684,411

[22] Filed: Jul. 19, 1996

[30] Foreign Application Priority Data

Jul. 20, 1995 [IT] Italy ................... MI95A1562

[51] Int. Cl.⁶ ........................................ C08F 2/34
[52] U.S. Cl. .................... 526/65; 526/352; 526/901
[58] Field of Search ................... 526/65, 352, 901

[56] References Cited

U.S. PATENT DOCUMENTS

| | | | |
|---|---|---|---|
| 4,218,339 | 8/1980 | Zucchini et al. | 252/429 B |
| 4,302,566 | 11/1981 | Karol et al. | 526/125 |
| 4,356,082 | 10/1982 | Gross | 208/164 |
| 4,399,054 | 8/1983 | Ferraris et al. | 526/125 |
| 4,472,520 | 9/1984 | Zucchini et al. | 502/104 |
| 4,621,952 | 11/1986 | Aronson | 406/138 |
| 4,703,094 | 10/1987 | Raufast | 526/65 |
| 4,748,272 | 5/1988 | Youssefyeh | 562/471 |
| 4,958,006 | 9/1990 | Bernier et al. | 528/501 |
| 5,139,985 | 8/1992 | Barb' et al. | 502/109 |
| 5,352,749 | 10/1994 | DeChellis et al. | 526/68 |

FOREIGN PATENT DOCUMENTS

| | | |
|---|---|---|
| 0 089 691 A2 | 9/1983 | European Pat. Off. |
| 0 154 334 A2 | 9/1985 | European Pat. Off. |
| 0 348 907 A2 | 1/1990 | European Pat. Off. |
| 0 369 640 A2 | 5/1990 | European Pat. Off. |
| 0 395 083 A2 | 10/1990 | European Pat. Off. |
| 0 478 418 A1 | 4/1992 | European Pat. Off. |
| 0 553 805 A1 | 8/1993 | European Pat. Off. |
| 0 553 806 A1 | 8/1993 | European Pat. Off. |
| 0 574 821 A2 | 12/1993 | European Pat. Off. |
| 574821 | 12/1993 | European Pat. Off. |
| 0 601 525 A1 | 6/1994 | European Pat. Off. |
| WO 92/21706 | 12/1992 | WIPO |
| WO 94/28032 | 12/1994 | WIPO |

OTHER PUBLICATIONS

L. Massimilla "Flow Properties of the Fluidized Dense Phase", pp. 651–676.

D. Geldart "Gas Fluidization Technology", p. 155 et seqq., J. Wiley & Sons Ltd., New York, 1971.

Abstract of Japanese Patent 58 032 634.

*Primary Examiner*—Thomas R. Weber
*Attorney, Agent, or Firm*—Bryan Cave LLP

[57] ABSTRACT

Process for gas-phase polymerization carried out in two interconnected polymerization zones, to which one or more α-olefins $CH_2$=CHR are fed in the presence of catalyst under reaction conditions and from which the polymer product is discharged. The process is characterized in that the growing polymer flows through a first polymerization zone under fast fluidization conditions, leaves said first zone and enters a second polymerization zone through which it flows in a densified form under the action of gravity, leaves said second zone and is reintroduced into the first polymerization zone, thus establishing a circulation of polymer around the two polymerization zones. The novel process allows olefins to be polymerized in the gas phase with high productivity per unit volume of the reactor without incurring the problems of the fluidized-bed technologies of the known state of the art.

23 Claims, 3 Drawing Sheets

PROCESS AND APPARATUS FOR THE GAS-PHASE POLYMERIZATION OF α-OLEFINS

The present invention relates to a process for the gas-phase polymerization of olefins carried out in two interconnected polymerization zones, to which one or more α-olefins $CH_2=CHR$ are fed in the presence of a catalyst under polymerization conditions and from which the produced polymer is discharged. In the process of the present invention the growing polymer particles flow through a first polymerization zone under fast fluidization conditions, leave said first zone and enter a second polymerization zone through which they flow in a densified form under the action of gravity, leave said second zone and are reintroduced into the first polymerization zone, thus establishing a circulation of polymer between the two polymerization zones.

The development of catalysts with high activity and selectivity of the Ziegler-Natta type and, in more and more applications, of the metallocene type, has led to the widespread use on an industrial scale of processes, in which the polymerization of the olefins is carried out in a gaseous medium in the presence of a solid catalyst. Compared with the more conventional technology in liquid suspension (of monomer or of monomer/solvent mixtures), this technology has the following advantages:

a) operational flexibility: the reaction parameters can be optimized on the basis of the characteristics of the catalyst and of the product and are not limited by the physico-chemical properties of the liquid mixtures of the reaction components (generally including hydrogen as a chain transfer agent);

b) widening of the product range: the effects of swelling of the growing polymer particle and of solubilization of polymer fractions in a liquid medium greatly reduce the range of production of all the kinds of copolymers;

c) minimization of the operations downstream of the polymerization: the polymer is obtained directly from the reactor in the form of dry solid and requires simple operations for removing dissolved monomers and deactivating the catalyst.

All the technologies devised hitherto for the gas-phase polymerization of α-olefins provide for maintaining a bed of polymer, through which the reaction gases flow; this bed is maintained in suspension either by mechanical stirring (stirred-bed reactor) or by fluidization obtained by recycling the reaction gases themselves (fluidized-bed reactor). In both the reactor types, the monomer composition around the polymer particle in the reaction is maintained sufficiently constant owing to the induced stirring. Said reactors approximate very closely the ideal behaviour of the "continuous stirred-tank reactor" (CSTR), making it relatively easy to control the reaction and thereby ensuring consistency of quality of the product when operating under steady-state conditions. What is by now the most widely established industrial technology is that of the fluidized reactor operating under "bubbling" conditions. The polymer is confined in a vertical cylindrical zone. The reaction gases exiting the reactor are taken up by a centrifugal compressor, cooled and sent back, together with make-up monomers and appropriate quantities of hydrogen, to the bottom of the bed thorough a distributor. Entrainment of solid in the gas is limited by an appropriate dimensioning of the upper part of the reactor (freeboard, i.e. the space between the bed surface and the gas offtake), where the gas velocity is reduced, and, in some designs, by the interposition of cyclones in the exit gas line.

The flow rate of the circulating gas is set so as to assure a fluidization velocity within an adequate range above the minimum fluidization velocity and below the "transport velocity".

The heat of reaction is removed exclusively by cooling the circulating gas. The catalyst components are fed in continuously. The composition of the gas-phase controls the composition of the polymer. The reactor is operated at constant pressure, normally in the range 1–3 MPa. The reaction kinetics are controlled by the addition of inert gases.

A significant contribution to the reliability of the fluidized-bed reactor technology in the polymerization of α-olefins was made by the introduction of suitably pretreated spheroidal catalyst of controlled dimensions and by the use of propane as diluent (see WO 92/21706).

Fluidized-bed technology has limits, some of which are discussed in detail below.

A) Removal of the heat of reaction.

The maximum fluidization velocity is subject to quite narrow limits (which already entail reactor volumes for disengagement which are equal to or greater than those filled by the fluidized bed). Depending on the heat of the reaction, the polymer dimensions and the gas density, a limit to the productivity of the reactor (expressed as hourly output per unit reactor cross-section) is inevitably reached, where operation with gas inlet temperatures higher than the dew point of the mixture of the gases is desired. This limit can lead to reductions in the plant output, in particular in the copolymerization of ethylene with higher α-olefins (hexene, octene), which is carried out with conventional Ziegler-Natta catalysts, requiring gas compositions rich in such olefins.

Many ways of overcoming the limits, in terms of heat removal, of the traditional technology have been proposed, based on partial condensation of the circulating gases and on the use of the latent heat of evaporation of the condensates for controlling the temperature in the interior of the reactor (see EP-89691, U.S. Pat. No. 5,352,749, WO 94/28032). Although technically worthy of consideration, all the systems proposed for implementing the principle render the operation of the fluidized reactors critical.

In particular (and apart from problems associated with the distribution of wet solids in the plenum below the distribution grid), the technology used in patents EP-89691 and U.S. Pat. No. 5,352,749 relies on the turbulence generated by the grid to distribute the liquid over the polymer. Possible coalescence phenomena in the plenum can give rise to uncontrollable phenomena of poor distribution of liquid with formation of agglomerates which can not be redispersed, in particular in the case of polymers which have a tendency to stick. The discrimination criterion given in U.S. Pat. No. 5,352,749 reflects situations under steady-state conditions, but offers no feasible guide for situations of even a transient "reaction runaway", which can lead to irreversible loss of fluidization, with a consequent collapse of the reactor.

The method described in patent WO 94/28032 involves separation of the condensates and their distribution above the grid by means of special, suitably located nozzles. In fact, the condensates inevitably contain solids in reactive conditions, whose concentration can become very high at low condensate amounts. Moreover, the inherent difficulty of uniformly distributing a suspension over a number of nozzles can compromise the operability of some of them and a blocking in one nozzle adversely affects the distribution of the liquid evaporating in the relevant section of the reactor. It is also clear that the efficiency of the operation depends upon a vigorous circulation of solids in the reactor and, below the injection points, this is reduced by an unbalancing of the gas flow rates caused by large quantities of condensates. Furthermore, any need for maintenance on one nozzle requires a complete shut-down of the reactor.

B) Molecular weight distribution

As already stated, a fluidized bed shows a behaviour directly comparable with an ideally mixed reactor (CSTR). It is generally known that, in the continuous polymerization of α-olefins in a single stirred stage (which also involves steady composition of the monomers and of the chain transfer agent, normally hydrogen) with Ti catalysts of the Ziegler-Natta type, polyolefins having a relatively narrow molecular weight distribution are obtained. This characteristic is even more emphasized when metallocene catalysts are used. The breadth of the molecular weight distribution has an influence both on the rheological behaviour of the polymer (and hence the processability of the melt) and on the final mechanical properties of the product, and is a property which is particularly important for the (co) polymers of ethylene. For the purpose of broadening the molecular weight distribution processes based on several reactors in series, in each of which it becomes possible to operate at least at different hydrogen concentrations, have gained industrial importance. A problem typically encountered also with these processes, when a very broad molecular weight distribution is required, is an insufficient homogeneity of the product. Particularly critical is the homogeneity of the material in blow-moulding processes and in the production of thin films, in which the presence of even small quantities of inhomogeneous material brings about the presence of unfused particles in the film ("fish eyes"). In patent application EP-574,821, a system of two reactors is proposed which operate at different polymerization conditions with mutual recirculation of polymer between the two. Even if the concept is suitable for solving the problem of the homogeneity of the product, as shown by the experimental results, such a system involves investment costs and a certain operational complexity.

In other cases, polymers of broad molecular weight distribution are obtained by the use of mixtures of different Ziegler-Natta catalysts in a single reactor, each catalyst being prepared so as to give a different response to hydrogen. It is clear that a mixture of granules each with its own individuality are obtained at the exit from the reactor. It is difficult to obtain homogeneity of the product by this route.

C) Discharge of the product

The technology of polymerizing α-olefins in gas-phase reactors has rapidly developed in the last years, and the range of polymers obtainable in this way has widened greatly. In particular, besides homopolymers of ethylene and propylene, a wide range of copolymers can be produced industrially, for example:

- random copolymers of propylene/ethylene, propylene/ethylene/higher α-olefins and propylene/higher α-olefins;
- polyethylenes of low and very low density (LLDPE, VLDPE), modified with higher α-olefins containing 4 to 8 carbon atoms;
- heterophasic copolymers of high impact strength, obtained by growth on the active centres of the catalyst, in successive stages, of one or more of the polymers listed above and of ethylene/propylene or ethylene/butene rubbers; and
- EPR and EPDM rubbers.

In short, in the polymers producible in the gas phase, the modulus of flexibility varies from 2300 MPa to values lower than 100 MPa, and the xylene-soluble fraction varies from 1% to 80%. The flowability, compactability and sticking properties turn out to be extremely variable as a function of the degree of crystallinity, of the molecular weight and of the composition of the various polymer phases. Many of these products remain granular and flowable (and hence processible) as long as they are maintained in a fluidized state or in flux, which are conditions under which the static forces between the individual solid particles have no effect. They tend more or less rapidly to clump together and to form aggregates if they are allowed to settle or to be compacted in stagnant zones; this phenomenon is particularly enhanced under reaction conditions where, due to the combined action of the temperature and the large quantity of dissolved hydrocarbons, the polymer is particularly soft, compressible and compactable, and sticky. The characterization of soft and sticky polymers is efficaciously described in EP-348, 907 or U.S. Pat. No. 4,958,006.

The most direct solution for the discharge of the polymer from the reactor consists of a direct discharge from the fluidized bed through a controlled valve. This type of discharge combines simplicity with the advantage of not producing stagnant zones. Where a sufficiently low pressure (in the range 0.5–3 bar gauge) is maintained downstream of the discharge valve, the reaction is virtually stopped either by the temperature reduction due to the evaporation of the monomers dissolved in the polymer or due to the low partial pressure of the monomers in the gas: in this way, any risk in the receiver equipment downstream of the reactor is avoided.

Nevertheless, it is known that the amount of gas discharged with the polymer from a fluidized bed through an orifice reaches very high values as a function of the reactor pressure, of the fluidization velocity, of the density of the solids in the bed, etc. (see, for example: Massimilla, "Flow properties of the fluidized dense phase", in "Fluidization", p.651–676, eds. Davidson & Harrison, Academic, New York, 1971). High amounts of gas discharged with the polymer represent both investment costs and operating costs, it being necessary to recompress this gas in order to get back to the reactor pressure from the receiver pressure. In many industrial applications, discontinuous discharge systems have thus been installed, with interposition of at least two hoppers in alternating operation. For example, U.S. Pat. No. 4,621,952 describes a discharge system in which the polymer is transferred intermittently and at high differential pressures from the reactor to a settling tank. The momentum of the polymer which, during the filling phase, impinges first on the walls of the settling tank and then on the bed of polymer compacts the material which loses its flowability properties. During the filling phase the pressure in the settling tank rises rapidly to the value of the reactor pressure and the temperature does not change significantly. The reaction proceeds adiabatically at high kinetics. With soft and sticky products, this easily leads to the formation of agglomerates which cannot be granulated, with consequent difficulties with the discharge to the receiving tank below. Analogous observations apply to U.S. Pat. No. 4,703,094.

The limits of the intermittent system are clearly revealed by the proposal for complicated continuous systems. Japanese patent JP-A-58 032,634 provides for the installation of an internal screw in the reactor for compacting the polymer towards the discharge; U.S. Pat. No. 4,958,006 proposes the installation of an extruder, the screws of which are fed directly in the interior of the fluidized-bed reactor. Apart from the complication and the difficulty of industrial application, the systems proposed are in any case altogether inadequate for feeding the polymer to a subsequent reaction stage.

A novel polymerization process has now been found, and this represents a first aspect of the present invention, which allows olefins to be polymerized in the gas phase with high hourly output per unit reactor volume without incurring the problems of the fluidized-bed technologies of the known state of the art. A second aspect of the present invention relates to an apparatus for carrying out this process.

The gas-phase polymerization process of the present invention is carried out in a first and in a second interconnected polymerization zones to which one or more α-olefins $CH_2$=CHR, where R is hydrogen or a hydrocarbon radical having 1-12 carbon atoms, are fed in the presence of catalyst under reaction conditions and from which the polymer produced is discharged. The process is characterized in that the growing polymer particles flow through the first of said polymerization zones under fast fluidization conditions, leave said first polymerization zone and enter the second of said polymerization zones through which they flow in a densified form under the action of gravity, leave said second polymerization zone and are reintroduced into said first polymerization zone, thus establishing a circulation of polymer between the two polymerization zones.

As is known, the state of fast fluidization is obtained when the velocity of the fluidizing gas is higher than the transport velocity, and it is characterized in that the pressure gradient along the direction of transport is a monotonic function of the quantity of injected solid, for equal flow rate and density of the fluidizing gas. Contrary to the present invention, in the fluidized-bed technology of the known state of the art, the fluidizing-gas velocity is maintained well below the transport velocity, in order to avoid phenomena of solids entrainment and particle carryover. The terms transport velocity and fast fluidization state are well known in the art; for a definition thereof, see, for example, "D. Geldart, Gas Fluidization Technology, page 155 et seqq., J. Wiley & Sons Ltd., 1986".

In the second polymerization zone, where the polymer flows in a densified form under the action of gravity, high values of density of the solid are reached (density of the solid=kg of polymer per $m^3$ of reactor occupied by polymer), which approach the bulk density of the polymer; a positive gain in pressure can thus be obtained along the direction of flow, so that it becomes possible to reintroduce the polymer into the first reaction zone without the help of special mechanical means. In this way, a "loop" circulation is set up, which is defined by the balance of pressures between the two polymerization zones and by the head loss introduced into the system.

The invention is described with reference to the attached figures, which are given for illustrative purposes without limiting the invention, in which:

BRIEF DESCRIPTION OF THE DRAWINGS

Referring to FIG. 1, the growing polymer flows through the first polymerization zone 1 under fast fluidization conditions along the direction of the arrow 14; in the second polymerization zone 2, the growing polymer flows in a densified form under the action of gravity along the direction of the arrow 14'. The two polymerization zones 1 and 2 are appropriately interconnected by the sections 3 and 5. The material balance is maintained by feeding in monomers and catalysts and discharging polymer.

Figure 1:
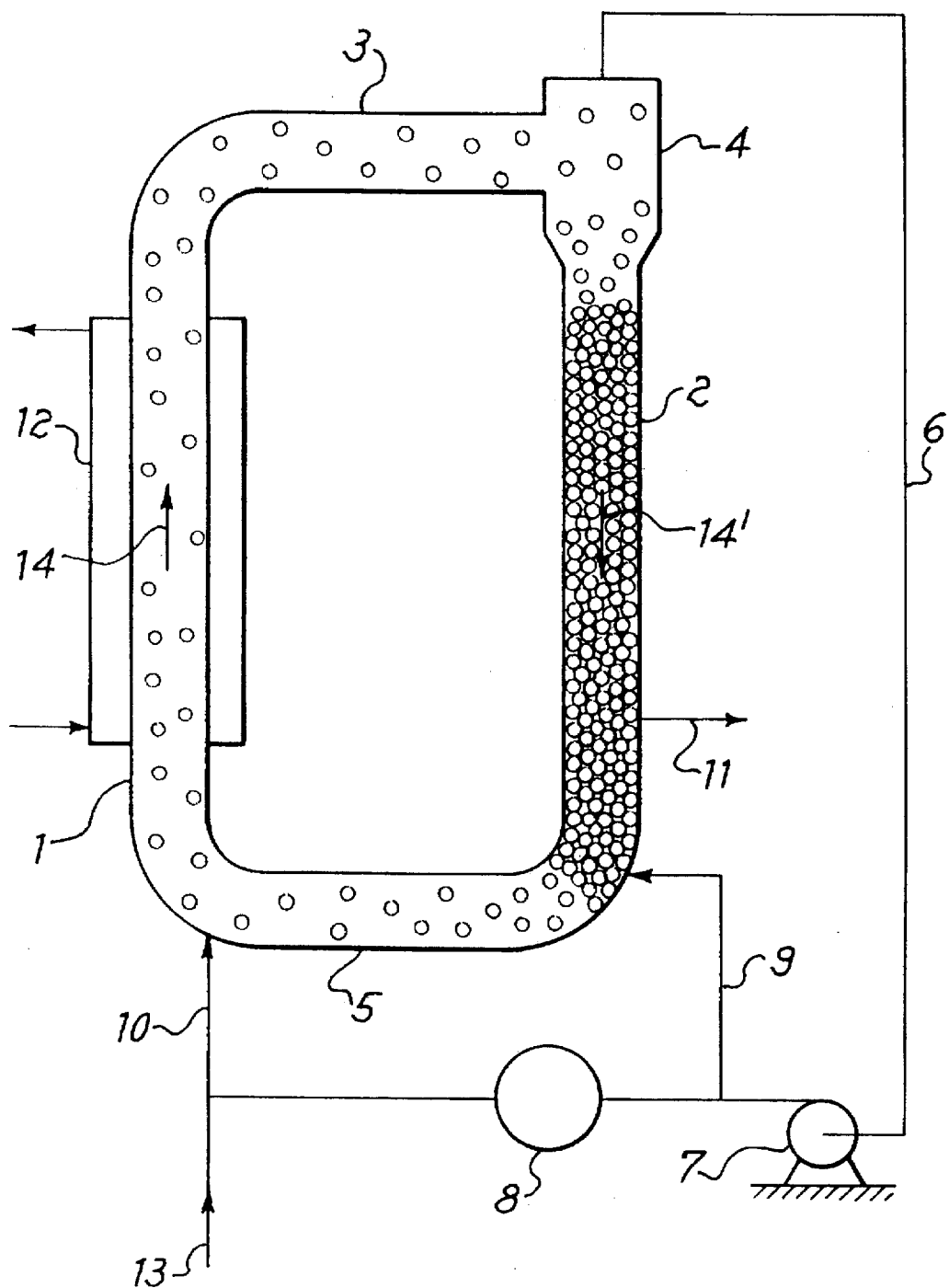
FIG. 1 is a diagrammatic representation of the process according to the invention.

Generally, the condition of fast fluidization in the first polymerization zone 1 is established by feeding a gas mixture comprising one or more α-olefins $CH_2$=CHR (line 10) to said zone 1; preferably, the feeding of the gas mixture is effected below the point of reintroduction of the polymer into said first zone 1 by the use, where appropriate, of gas distributor means, such as, for example, a distributor grid. The velocity of the transport gas into the first polymerization zone is higher than the transport velocity under the operating conditions and is preferably between 2 and 15 m/s, more preferably between 3 and 8 m/s.

The control of the polymer circulating between the two polymerization zones can be effected by metering the amount of polymer leaving the second polymerization zone 2, using means suitable for controlling the flow of solids, such as, for example, mechanical valves (slide valve, V-ball valve, etc.) or non-mechanical valves (L valve, J valve, reverse seal, etc.).

Generally, the polymer and the gaseous mixture leaving the first polymerization zone 1 are conveyed to a solid/gas separation zone 4. The solid/gas separation can be effected by using conventional separation means such as, for example, a separator of the inertial type or preferably centrifugal type, or a combination of the two. The centrifugal separator (cyclone) can be of the axial, spiral, helical or tangential type.

From the separation zone 4, the polymer enters the second polymerization zone 2. The gaseous mixture leaving the separation zone 4 is compressed, cooled and transferred, if appropriate with addition of make-up monomers and/or molecular weight regulators, to the first polymerization zone 1. This transfer can be effected by means of a recycle line 6 for the gaseous mixture, equipped with means for the compression 7 and cooling 8 and means for feeding in the monomers and the molecular weight regulator 13.

A part of the gaseous mixture leaving the separation zone 4 can be transferred, after having been compressed, to the connection zone 5 via the line 9, in order to facilitate the transfer of polymer from the second to the first polymerization zone.

Preferably, the various catalyst components are fed to the first polymerization zone 1, at any point of said first polymerization zone 1. However, they can also be fed at any point of said second polymerization zone 2. Any type of catalyst used in the polymerization of olefins can be used in the process of the present invention, since it is not important for it to be in any particular physical state, and catalysts in either solid or liquid form can be used, because, in contrast to the gas-phase processes of the known state of the art, the process of the present invention does not necessarily require the use of catalysts in which at least one component is in a granular form, but can be carried out with catalysts in which the various components are in solution. For example, catalysts based on titanium, chromium, vanadium or zirconium can be used either in supported or unsupported form. Examples of catalysts which can be used are described in the patents U.S. Pat. Nos. 4,748,272, U.S. Pat. No. 4,302,56, U.S. Pat. No. 4,472,520 and U.S. Pat. No. 4,218,339.

Particularly suitable are the catalysts of controlled morphology, which are described in the patents U.S. Pat. No. 4,399,054, U.S. Pat. No. 5,139,985, EP-395,083, EP-553, 805, EP-553,806 and EP-601,525, and in general catalysts capable of giving polymers in the form of spheroidal particles having a mean dimension between 0.2 and 5 mm, preferably between 0.5 and 3 mm. The process of the present invention is moreover particularly suitable for the use of metallocene catalysts, either in solution or supported. The various catalyst components can be introduced at the same point or at different points of the first polymerization zone.

The catalyst can be fed in without prior treatment or in a prepolymerized form. Where other polymerization stages are situated upstream, it is also possible to feed the polymerization zones with a catalyst dispersed in a polymer suspension coming from an upstream bulk reactor, or a catalyst dispersed in a dry polymer coming from an upstream gas-phase reactor.

The polymer concentration in the reactive zones can be monitored by the usual methods known in the state of the art, for example by measuring the differential pressure between two suitable points along the axis of the polymerization zones or measuring the density by nuclear detectors (for example γ-rays).

The operating parameters such as, for example, the temperature are those that are usual in gas-phase olefin polymerization processes, for example between 50° C. and 120° C.

The process according to the present invention has many advantages. The loop configuration allows the adoption of relatively simple reactor geometries. In practice, each reaction zone can be designed as a cylindrical reactor of high aspect ratio (height/diameter ratio). From the point of view of construction, this particular reactor geometry allows the adoption of high operating pressures, which are not economical in conventional fluidized-bed reactors. The process according to the present invention can thus be carried out under operating pressures of between 0.5 and 10 MPa, preferably between 1.5 and 6 MPa. The consequent high gas density favours both the heat exchange on a single particle and the overall removal of the heat of reaction. It is therefore possible to choose operating conditions which enhance the reaction kinetics. Moreover, the reactor through which the polymer flows under fast fluidization conditions (first polymerization zone) can run completely full at polymer concentrations which can reach or exceed 200 kg/m$^3$. With the contribution of the second polymerization zone and taking account of the more favourable kinetic conditions which can be established, the process of the present invention makes it possible to obtain specific productivities (hourly output per unit volume of the reactor) which are much higher than the levels obtainable with conventional fluidized-bed technology. It is thus possible to equal or even to exceed the catalytic yields of conventional gas-phase processes, using polymerization equipment of much more limited dimensions, with a significant saving in the construction cost of the plant.

In the process according to the present invention, the entrainment of solids in the gas recycle line at the exit from the solid/gas separation zone and the possible presence of liquids exiting the cooler on the same line do not limit the efficiency of the first polymerization zone. Even when using gas distributor means such as, for example, a grid, the transport gas velocities in the plenum below the grid are still high and such as to ensure the entrainment of droplets of even considerable dimensions and of wetted polymer, without stagnant points. Given that the transport gas comes into contact with the stream of hot polymer arriving from the second polymerization zone, the vaporization of any liquid is virtually instantaneous. It is therefore possible to cool the gaseous mixture leaving the solid/gas separation zone to temperatures below the dew point in order to condense part of the gases. The gas/liquid mixture which forms is then fed to the first polymerization zone where it contributes to heat removal without encountering the problems and limits of the known state of the art and without requiring the use of the complicated devices proposed to avoid them. In addition to and/or in replacement of the partial condensation of the recirculating gases, the process of the invention opens a new way to the removal of the heat of reaction. The characteristic geometry (high surface/volume ratio) of the polymerization zone with fast fluidization makes a significant external surface area available for direct heat exchange on this zone (and hence with maximum heat transfer between cooling liquid and reaction system). Where convenient, additional or alternative heat exchange surfaces can be present in the interior of the reactor. The first polymerization zone can thus be advantageously cooled with external cooling means. The high turbulence connected with the fast fluidization conditions and a high gas density assure in every case a very high heat transfer coefficient. Any condensation on the internal walls is continuously removed by the strong radial and axial mixing of the polymer due to the fast fluidization conditions. Moreover, this characteristic makes the proposed technology suitable for operation as a second stage fed directly from an upstream bulk reactor. It is also possible to feed part of the make-up monomers in a condensed form without any difficulty. As far as the removal of the heat of reaction is concerned, the capacities offered by the process of the invention are superior to those of the known state of the art and the difficulties inherent in the prior technologies are overcome. Moreover, the volumetric rates of the circulating gas are not necessarily dependent upon the requirements of heat exchange.

Advantageously, one or more inert gases are maintained in the polymerization zones, in such quantities that the sum of the partial pressures of the inert gases is preferably between 5 and 80% of the total pressure of the gases. The inert gas can be nitrogen or an aliphatic hydrocarbon having 2–6 carbon atoms, preferably propane. The presence of the inert gas has numerous advantages, for it makes it possible to moderate the reaction kinetics while at the same time maintaining total reaction pressures which are sufficient to keep low the head of the circulation compressor and to assure an adequate mass flow rate for the heat exchange on the particle in the bed and, through the cooler on the circulating gaseous mixture, for the removal of the heat of reaction which has not been removed by the surfaces.

In the process of the present invention, the presence of the inert gas has further advantages, inasmuch as it makes it possible to limit the temperature increase in the second polymerization zone, which runs in an essentially adiabatic mode, and also makes it possible to control the breadth of the molecular weight distribution of the polymer, particularly in the polymerization of ethylene. This is because, as already stated, the polymer flows vertically down through the second polymerization zone in plug flow (packed flow mode), surrounded by limited quantities of entrained gas. As is known, the molecular weight of the polymer in ethylene polymerization is controlled by the hydrogen/ethylene ratio in the gas phase and, to a lesser extent, by the temperature. In the presence of inerts, given that the reaction consumes ethylene but hydrogen only to a marginal extent, the ethylene/hydrogen ratio decreases along the axis of the polymer flow in the direction of movement, causing growth of polymeric fractions on the same particle with decreasing molecular weights. The temperature rise due to the reaction adds to this effect. It is therefore possible, by means of an appropriate balancing of the gas composition and the residence times in the two polymerization zones, to control in an effective manner the broadening of the molecular weight distribution of the polymers while at the same time maintaining maximum homogeneity of the product.

Conversely, if it is desired to produce polymers with a narrow molecular weight distribution, the mechanism described above can be restricted or avoided by proper selection of the reaction conditions, for example by limiting the amount of inert gas or feeding an appropriate quantity of reaction gas and/or make-up monomer(s) at suitable positions in the second polymerization zone. Advantageously, the gas to be fed to the second polymerization zone can be taken from the gaseous mixture leaving the solid/gas separation zone, after this has been compressed. The quantity of gas introduced is preferably fixed within values such that the relative velocity of the injected gas with respect to the flowing solid velocity, is kept below the minimum fluidization velocity characteristic of the solid/gas system present in said second polymerization zone. Under these conditions, the downward flow of polymer is substantially not disturbed. The operational flexibility of the process of the invention is therefore total, the production of polymers of different molecular weight distribution being controllable by the gas composition and, if needed, by simple closing or opening of a valve on a gas line. Advantageously, the polymer can be discharged from zones where the solids density is higher, for example from suitable points in the second polymerization zone where large amounts of densified flowing polymer are available, in order to minimise the quantity of entrained gas. By inserting a controlled valve at a suitable point upstream of the exit region of the polymer from the second polymerization zone, it becomes possible continuously to control the withdrawal of the polymer produced. The amount of gas accompanying the polymer is extremely small and only slightly greater than can be achieved by the device of interposing a series of hoppers in alternating intermittent operation. In this way, all the limitations of the discharge systems of the known state of the art are overcome, with respect to both the quantity of entrained gas and the nature of the discharged products.

As already stated, the process of the present invention can be combined with the conventional technologies in a sequential multi-stage process in which, upstream or downstream of a polymerization section operated according to the present invention, there are one or more polymerization stages using conventional technologies (in bulk or in the gas phase, either in a fluidized bed or a stirred bed). Multi-stage processes, wherein two or more stages are carried out with the procedure of the present invention, are also possible.

It is moreover possible to combine the process according to the present invention with the conventional fluidized-bed gas-phase technologies by interposing, between the two polymerization zones as defined in the present invention, a polymerization zone using a fluid bubble bed, i.e. with fluidization gas velocities higher than the minimum fluidization velocity and lower than the transport velocity, while always maintaining the loop circulation characteristic of the process of the present invention. For example, one possible embodiment provides that the second polymerization zone consists of a first and a second section. In the first (with respect to the downward flow of the polymer) of said sections a fluidized bed is maintained by appropriately feeding and distributing gases; in the second section, appropriately connected to the first one, the polymer flows in densified form by gravity. From the second section the polymer is reintroduced into the first polymerization zone, maintaining the loop circulation. With an appropriate dimensioning of the various zones, it becomes possible to achieve a braodening of the molecular weight distribution of the polymer, while retaining all the advantages described above.

The above example is only one of the possible embodiments of the process of the invention, which, in its general definition, comprises at least a fast fluidization zone interconnected with a zone where the polymer flows in densified form by gravity.

The process of the present invention is applicable to the preparation of a large number of olefin polymers without the disadvantages described above. Examples of polymers which can be obtained are:

high-density polyethylenes (HDPEs having relative densities higher than 0.940) including ethylene homopolymers and ethylene copolymers with $\alpha$-olefins having 3 to 12 carbon atoms;

linear polyethylenes of low density (LLDPEs having relative densities lower than 0.940) and of very low density and ultra low density (VLDPEs and ULDPEs having relative densities lower than 0.920 down to 0.880) consisting of ethylene copolymers with one or more $\alpha$-olefins having 3 to 12 carbon atoms;

elastomeric terpolymers of ethylene and propylene with minor proportions of diene or elastomeric copolymers of ethylene and propylene with a content of units derived from ethylene of between about 30 and 70% by weight;

isotactic polypropylene and crystalline copolymers of propylene and ethylene and/or other $\alpha$-olefins having a content of units derived from propylene of more than 85% by weight;

heterophasic propylene polymers obtained by sequential polymerization of propylene and mixtures of propylene with ethylene and/or other $\alpha$-olefins;

atactic polypropylene and amorphous copolymers of propylene and ethylene and/or other $\alpha$-olefins containing more than 70% by weight of units derived from propylene;

poly-$\alpha$-olefins, such as, e.g., poly-1-butene, poly-4-methyl-1-pentene;

polybutadiene and other polydiene rubbers.

A further aspect of the present invention relates to an apparatus for the gas-phase polymerization of $\alpha$-olefins. The apparatus of the invention comprises a first vertical cylindrical reactor 20 equipped with a catalyst feedline 34, and a second vertical cylindrical reactor 30 equipped with a polymer discharge system 23, and is characterized in that: the upper region of the first reactor 20 is connected by a first line 21 to a solid/gas separator 22 which in turn is connected to the upper region of the second reactor 30; the lower region of the second reactor 30 is connected by a second line 31 to the lower region of the first reactor 20; and the solid/gas separator 22 is connected by means of a recycle line for the gaseous mixture 36 to the first reactor 20 in a region 37 at the bottom of said first reactor 20 below the point of entry of the second line 31.

Preferably, the first reactor 20 is equipped with gas distributor means 33, for example a grid, located between the point of entry of the second line 31 and the region 37 at the bottom of this reactor. As an alternative, with reference to FIG. 3, the gas distributor means in the first reactor 60 can be replaced by a cylindrical line 65, through which the gas flows at high velocity and which is connected to the reactor 60 by a frustoconical section 62 whose angle of inclination to the vertical is preferably smaller than 45° and more preferably between 30° and 10°. Advantageously both the catalyst (thorough line 66) and the polymer coming from the second reactor 70 through the line 77 can be conveyed through this frustoconical connection.

A first valve 24 for controlling the polymer flow rate is generally inserted between the second reactor 30 and the second line 31. This valve 24 can be either of the mechanical or of the non-mechanical type.

In the case where gas distributor means 33 are present, some or all the components of the catalyst can advantageously be injected via a third line 32 into said first reactor 20 at a point above the gas distributor means.

Advantageously, the recycle line for the gaseous mixture 36 is equipped with a compressor 26, a cooling system 27 and systems for introducing, together or separated, monomers 28 and molecular weight regulator 29. Two cooling systems, one upstream and one downstream the compressor, can be present.

Preferably, the first line 21 leaves the upper region of the first reactor laterally, it having been observed that a lateral exit of the solid/gas mixture from the first reactor 20 contributes in a substantial way to the dynamic stability of the entire reaction system.

The upper region of the first reactor 20 can have a cylindrical shape with a diameter equal to that of the reactor or preferably can be of frustoconical geometry with the broad end uppermost.

Figure 3:
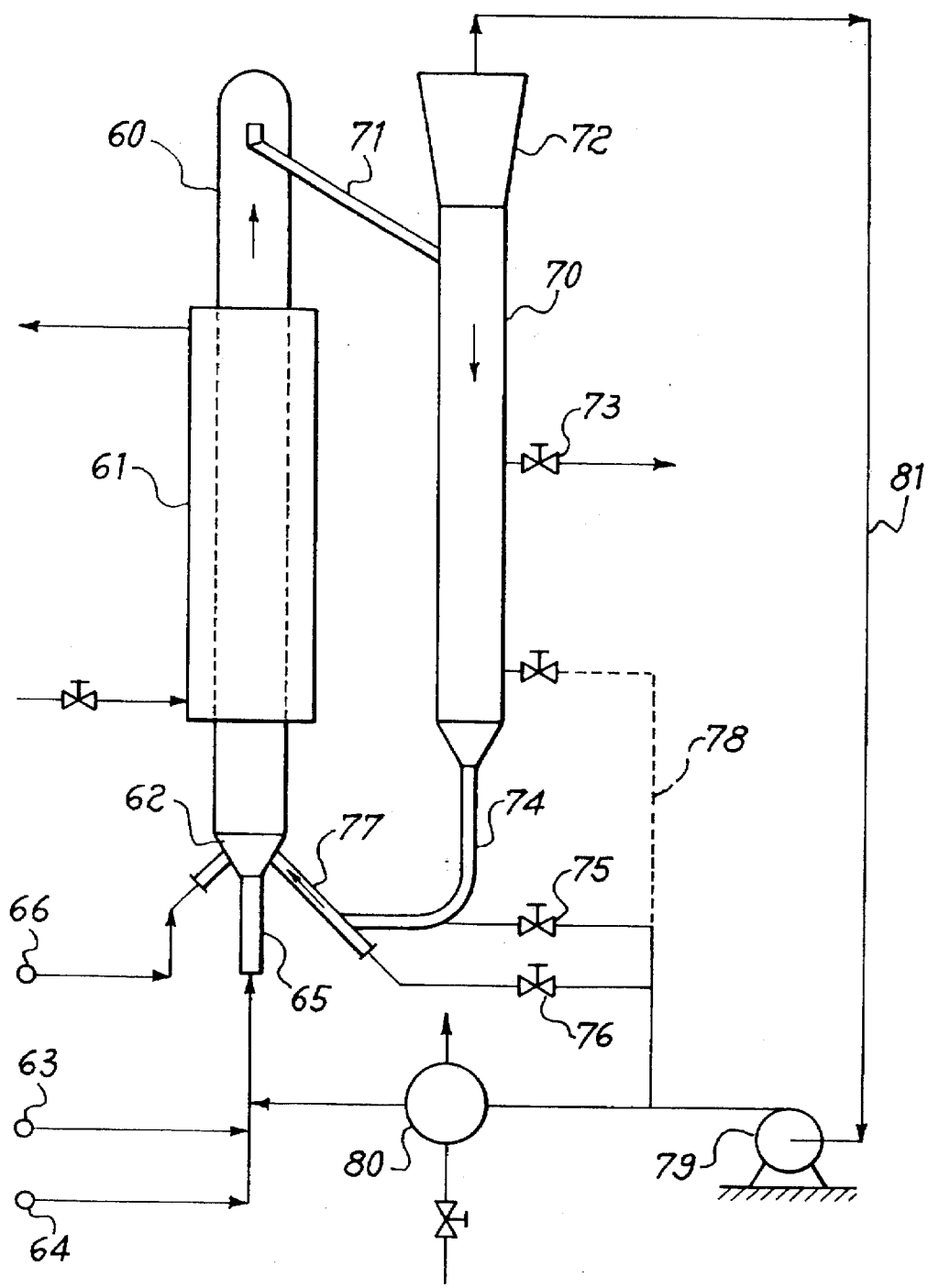
FIG. 3 is a diagrammatic representation of a second embodiment of the process according to the invention.

The first line 21 can be horizontal or have a slope in the direction of gravity in order to facilitate discharge of polymer (see the configuration of the line 71 in FIG. 3). The second line 31 can appropriately be inclined downwards and can be connected (at a point immediately downstream of the first valve 24) via a line 25 to the gas recirculation line 36 at a point downstream of the compressor 26. In this way, the flow of polymer is assisted by the stream of gas under pressure coming from the recycle line, avoiding stagnant zones of polymer in the line itself and at the point of introduction into the reactor 20.

The system of connection between the lower regions of the reactors can also be of the type described in FIG. 3, in which the circulation of the polymer is obtained by a pneumatic L valve 74 operated by the gas taken from the recycle line through the line 75. The L valve is connected to a line 77 which leads into the first reactor 60, said line 77 being connected via the line 76 to the recycle line 81. Through this line, the polymer is carried back to the interior of the reactor 60 by an appropriate stream of gas coming from the line 76.

Figure 2:
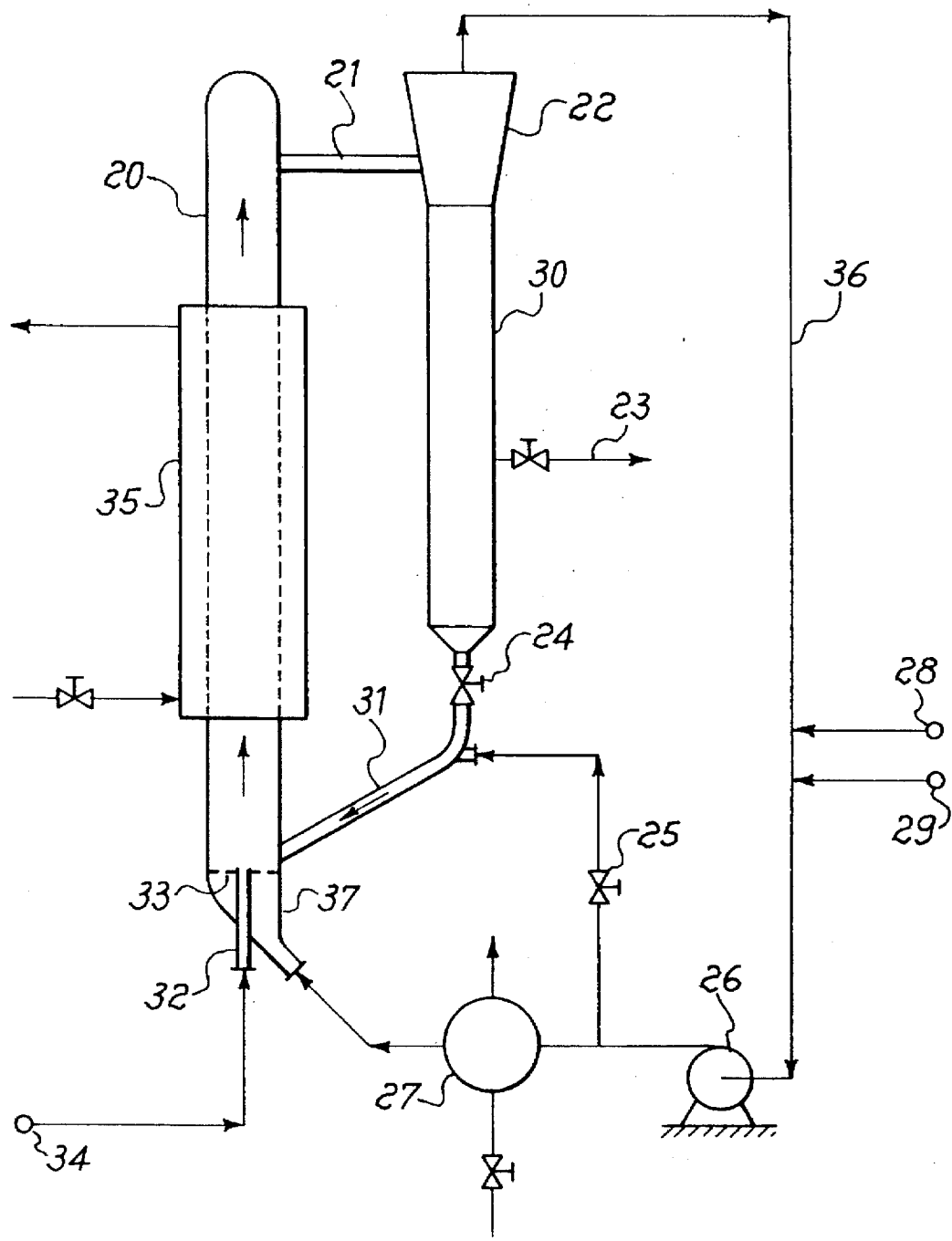
FIG. 2 is a diagrammatic representation of a first embodiment of the process according to the invention.

The first reactor 20 can advantageously be equipped with external cooling means 35, such as wall heat exchangers. Two possible embodiments of the invention are illustrated in FIG. 2 and in FIG. 3. These embodiments have a purely illustrative purpose and do not limit the invention. With reference to FIG. 2, 20 represents the first reactor operating under fast fluidization conditions and 30 represents the second reactor through which the polymer flows in a densified form under the action of gravity; 21 and 31 are lines connecting the upper and lower regions of the two reactors; 34 is the catalyst feedline; 22 is a solid/gas separator; 23 is a polymer discharge system; 36 is the recycle line for the gaseous mixture which connects said separator to a region 37 at the bottom of the first reactor; 24 is a control valve for controlling the polymer flow rate; 33 is a gas distributor device; 32 is a line for feeding the catalyst; 26 is a compressor and 27 is a cooling system for the recycling gas mixture; 28 and 29 are systems for feeding monomers and molecular weight regulator; 25 is a line which connects the recycle line 36 to the line 31; 35 is the external cooling system of the first reactor 20.

With reference to FIG. 3, 60 represents the first reactor operating under fast fluidization conditions and 70 represents the second reactor through which the polymer flows in a densified form under the action of gravity; 71 and 77 are lines connecting the upper and lower regions of the two reactors; 66 is the catalyst feedline; 72 is a solid/gas separator; 73 is the polymer discharge system; 81 is the recycle line for the gaseous mixture, which connects said separator 72 to a line 65 connected to the base of the first reactor 60 by a frustoconical section 62; 74 is an L valve for controlling the polymer flow rate; 79 is a compressor and 80 is a cooling system for the gaseous recycle mixture; 63 and 64 are feed systems for monomers and molecular weight regulator; 75 is a line which connects the recycle line 81 to the L valve 74; 76 is a line which connects the recycle line 81 to the line 77; 78 is a line which connects the recycle line 81 to a region at the bottom of the second reactor 70; 61 is the external cooling system for the first reactor 20.

The following examples will further illustrate the present invention without limiting its scope.

EXAMPLES

General polymerization conditions. Polymerizations were carried out in continuous in a plant which comprised a precontacting section, where the various catalyst component were premixed, a prepolymerization section, and a gas-phase polymerization section carried out in a reactor of the type described in FIG. 2.

A solid catalyst component prepared according to the procedure described in Example 3 of EP-A-395083, triethylaluminum (TEAL) and a silane compound were precontacted in hexane at 10° C. for 10 minutes in the precontacting vessel. The activated catalyst was fed to the prepolymerization section were propylene was polymerized in slurry using propane as dispersing medium. Monomer feed and residence time were adjusted so as to obtain the desired prepolymerization yields, in terms of g of polymer per g of solid catalyst component.

The prepolymer was continuously fed to the gas phase polymerization apparatus. The apparatus, which is described with reference to FIG. 2, consisted of two cylindrical reactors 20 and 30, connected by pipes 21 and 31. Reactor 20 was equipped with a heat exchanger 35. Fast fluidization in the reactor 20 was achieved by recycling gas from the gas/solid separator 22 to the bottom of the reactor 20, via the gas-recycle line 36. No gas-distribution means were used, the recycle gases being directly fed to a region 37 at the bottom of the reactor 20, below the point of entry of pipe 31. The gas-recycle line was equipped with a compressor 26 and a heat exchanger 27. The prepolymer slurry reactor was fed to the reactor 20 at a point immediately above the point of entry of pipe 31. Circulation of polymer was controlled via a L valve 24 operated by a stream of gas 25 taken from the recycle line 36. Make-up monomers were fed to the recycle line 36. The polymer produced was continuously discharged from the reactor 30, via pipe 23. Total volume of the apparatus (i.e. reactors 20 and 30 plus connection zones 21 and 31) was 250 1.

Example 1

Polypropylene was prepared using a catalyst comprising dicyclopentyl-dimethoxy-silane (DCPMS) as silane compound. In the gas-phase polymerization step, propane was used as inert gas.

| Main operating condition. | | |
|---|---|---|
| Precontacting step. | | |
| TEAL/solid component | (wt.) | 8 |
| TEAL/DCPMS | (wt.) | 3 |
| Prepolymerization step. | | |
| Yield | (g/g) | 100 |
| Gas-Phase Polymerization. | | |
| Temperature | (°C.) | 85 |
| Pressure | (barg) | 25 |
| Propylene | (% mol) | 91 |
| Propane | (% mol) | 8 |
| Hydrogen | (% mol) | 1 |
| Specific productivity | (Kg/h · m³) | 140 |
| Product Characteristics. | | |
| Bulk Density | (kg/l) | 0.45 |

Example 2

Hexene-modified LLDPE was prepared using a catalyst comprising cyclohexyl-methyl-dimethoxy-silane (CMMS) as silane compound. In the gas-phase polymerization step, propane was used as inert gas.

| Main operating condition. | | |
|---|---|---|
| Precontacting step. | | |
| TEAL/Ti | (wt.) | 120 |
| TEAL/CMMS | (wt.) | 20 |
| Prepolymerization step. | | |
| Yield | (g/g) | 400 |
| Gas-Phase Polymerization. | | |
| Temperature | (°C.) | 75 |
| Pressure | (barg) | 24 |
| Ethylene | (% mol) | 15 |
| 1-Hexene | (% mol) | 1.5 |
| Hydrogen | (% mol) | 3 |
| Propane | (% mol) | 80.5 |
| Specific productivity | (Kg/h · m³) | 80 |
| Product Characteristics. | | |
| Melt Index E | (g/10 min) | 1.4 |
| Density | (g/cm³) | 0.908 |

The above reported temperature was measured at top of the reactor 30. The dew point of the gaseous mixture at the operating pressure is 66° C. Cooling fluid was circulated in the heat exchanger 35 in such a way to obtain a temperature of 63° C. on the surface of reactor 20. Under these conditions, the gaseous mixture partially condensed on the wall of the reactor, thus contributing to remove the heat of reaction. No problems of fouling occurred during operation.

We claim:

1. Process for the gas-phase polymerization of α-olefins $CH_2=CHR$, where R is hydrogen or a hydrocarbon radical having 1–12 carbon atoms, carried out in a first and in a second interconnected polymerization zones, to which one or more of said α-olefins are fed in the presence of a catalyst under reaction conditions and from which the polymer product is discharged, wherein the growing polymer particles flow through the first of said polymerization zones under fast fluidization conditions, leave said first polymerization zone and enter the second of said polymerization zones through which they flow in a densified form under the action of gravity, leave said second polymerization zone and are reintroduced into said first polymerization zone, thus establishing a circulation of polymer between the two polymerization zones.

2. Process according to claim 1, wherein said fast fluidization conditions are established by feeding a gaseous mixture comprising one or more of said α-olefins $CH_2=CHR$ to said first polymerization zone.

3. Process according to claim 2, wherein said gaseous mixture is fed to said first polymerization zone in a region below the point of reintroduction of the polymer into said first polymerization zone.

4. Process according to claim 3, wherein the feeding of said gaseous mixture is carried out by means of gas distributor means.

5. Process according to claim 2, wherein the polymer and the gaseous mixture leaving said first polymerization zone are conveyed to a solid/gas separation zone and the polymer leaving said solid/gas separation zone enters said second polymerization zone.

6. Process according to claim 1, wherein the control of the polymer circulating between the said two polymerization zones is effected by metering the quantity of polymer leaving said second polymerization zone.

7. Process according to claim 1, wherein the polymer produced is withdrawn continuously from said second polymerization zone.

8. Process according to claim 1, wherein the catalyst components are fed to said first polymerization zone.

9. Process according to claim 1, wherein any of the reaction zones is fed with a catalyst in a prepolymerized form.

10. Process according to claim 1, wherein any of the reaction zones is fed with a catalyst dispersed in a polymer slurry.

11. Process according to claim 1, wherein any of the reaction zones is fed with a catalyst dispersed in a dry polymer.

12. Process according to claim 5, wherein the gaseous mixture leaving said solid/gas separation is compressed, cooled and transferred, if appropriate with addition of make-up monomers, to said first polymerization zone.

13. Process according to claim 5, wherein part of the gaseous mixture leaving the solid/gas separation zone is used for transferring the polymer from said second zone to said first polymerization zone.

14. Process according to claim 5, wherein part of the gaseous mixture leaving said solid/gas separation zone is compressed and transferred to said second polymerization zone in the vicinity of the region where the polymer leaves said second zone.

15. Process according to claim 12, wherein the gaseous mixture leaving said solid/gas separation zone is cooled to temperatures below the dew point.

16. Process according to claim 1, wherein said first polymerization zone is cooled by external cooling means.

17. Process according to claim 1, wherein the make-up monomer or monomers are fed in an at least partially condensed form to said first polymerization zone.

18. Process according to claim 2, wherein the velocity of the fluidizing gas into said first polymerization zone is between 2 and 15 m/s, preferably between 3 and 8 m/s.

19. Process according to claim 1, wherein the polymer is in the form of spheroidal particles having mean dimensions of between 0.2 and 5 mm, preferably between 0.5 and 3 mm.

20. Process according to claim 1, wherein the working pressure is between 0.5 and 10 MPa, preferably between 1.5 and 6 MPa.

21. Process according to claim 1, wherein one or more inert gases are present in said polymerization zones at partial pressures of between 5 and 80% of the total pressure of the gases.

22. Process according to claim 21, wherein the inert gas is nitrogen or an aliphatic hydrocarbon having 2–6 carbon atoms, preferably propane.

23. Process according to claim 1, wherein an intermediate polymerization zone, operating with a fluid bed, is interposed between said first and said second polymerization zones.

* * * * *